UNITED STATES PATENT OFFICE.

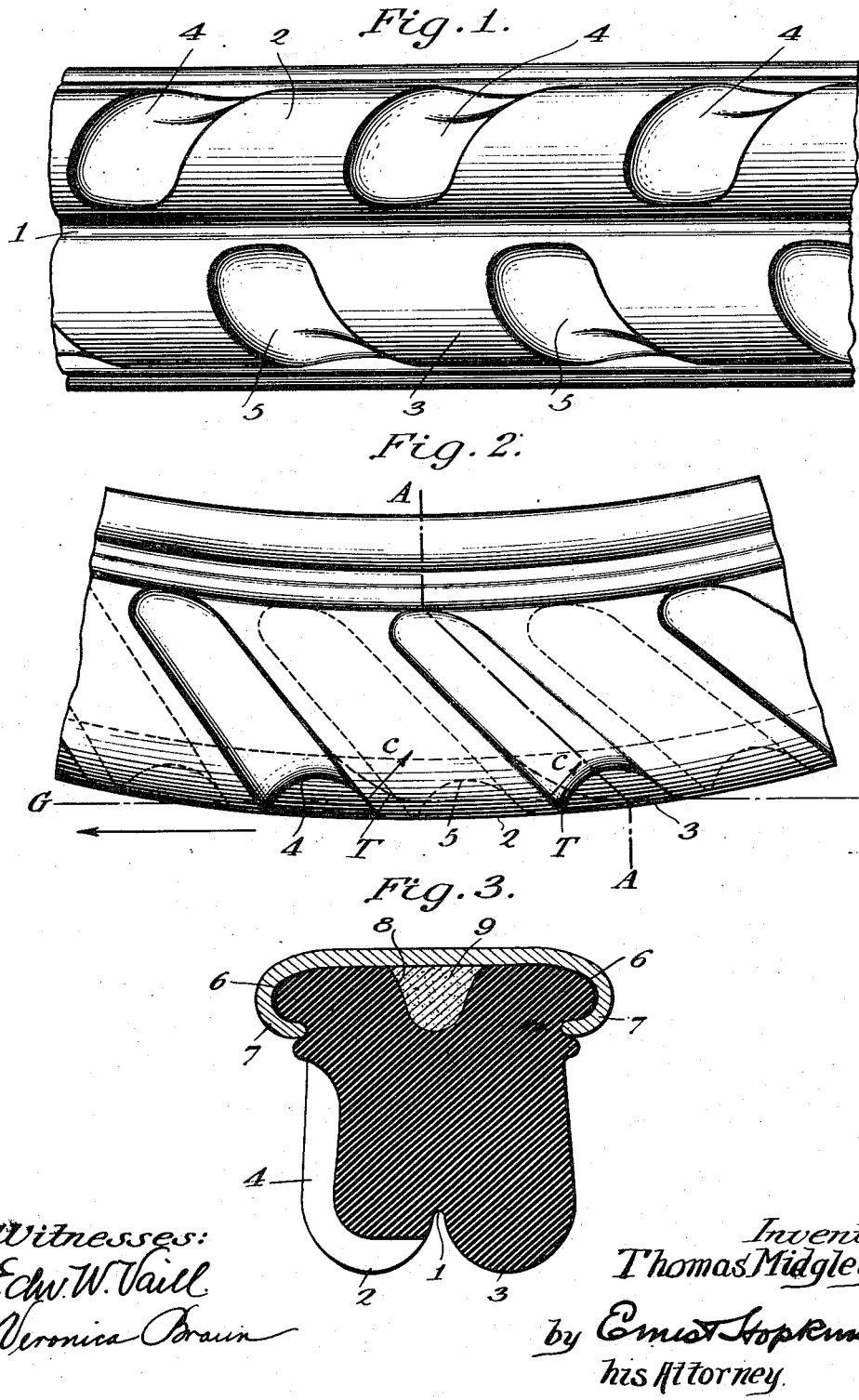

THOMAS MIDGLEY, OF WORTHINGTON, OHIO, ASSIGNOR TO MORGAN & WRIGHT, OF DETROIT, MICHIGAN, A CORPORATION OF MICHIGAN.

ELASTIC VEHICLE-TIRE.

1,152,830.        Specification of Letters Patent.        Patented Sept. 7, 1915.

Application filed November 21, 1911. Serial No. 661,472.

*To all whom it may concern:*

Be it known that I, THOMAS MIDGLEY, a citizen of the United States, residing at Worthington, county of Franklin, and State of Ohio, have invented certain new and useful Improvements in Elastic Vehicle-Tires, of which the following is a full, clear, and exact disclosure.

My invention relates to that class of vehicle tires particularly adapted for use on automobiles and other self-propelled vehicles, on which the tires are required to be of the most efficient resiliency and at the same time to possess strong traction and antiskidding properties, as well as durability.

My invention is particularly applicable to solid tires, but the tread configuration is also equally applicable to tires of the cushion or pneumatic type.

For a detailed description of one form of my invention, which I at present deem preferable, reference may be had to the following specification and to the accompanying drawing forming a part thereof in which—

Figure 1 is a plan view of a portion of my improved tire, Fig. 2 is a side elevation thereof and Fig. 3 is a sectional view taken substantially on the line A—A Fig. 2.

Referring to the drawing, it will be seen that the cross sectional shape of the tire is in general outline approximately rectangular. The outer or tread portion of the tire is, however, divided by a longitudinal approximately V-shaped groove 1, the edges of the grove and the corners of the tire being rounded to form two semi-circular parallel ridges, 2 and 3. The bottom of the groove 1 is preferably slightly widened, as indicated, so as to obviate the lodgment of sand and other foreign matter, and to facilitate easy manufacture.

Each of the ridges 2 and 3, are grooved on their external sides, as indicated by the numerals 4 and 5. These grooves extend transversely along the sides of the tire and follow its tread surface until they intersect the central groove 1. These grooves are preferably arranged at alternate points on the respective ribs 2 and 3, as shown most clearly in Fig. 1. The grooves 4 and 5 are also inclined relative to the radii of the wheel, as indicated in Fig. 2. This inclination of the grooves and the consequent inclination of the projections formed thereby as divisions of the ribs 2 and 3, are of especial importance as affecting the resiliency of the tire for the following reasons:

Referring particularly to Fig. 2 of the drawing, the arrow indicates the direction in which the wheel and vehicle should preferably and normally travel. That is to say the tires should be placed on the pins so that the grooves 4 and 5 at the lower part of the wheel incline toward the forward part of the vehicle.

The line G—G represents the surface of the ground or road and indicates approximately the compression of the tread of the tire as it passes over the ground. Under this compression, the walls of the grooves 4 and 5, and consequently the projections formed by the latter, will be deflected in a direction indicated by the arrow c, so that said walls take the position shown by the dotted lines T. This deflection of the projections formed by the grooves being at an angle to the road surface less than a right angle, causes a force to act in the opposite direction to the arrows c, when the projections leave the ground, thus delivering up the energy of deflection in the form of a force tending to drive the wheel forward. Thus the resiliency of the tire is increased because the body of the projections are deflected laterally instead of being compressed in a direction normal to the road surface, as they would be if the projections formed by the grooves 4 and 5 were radial instead of inclined. This action of the tire when taken with the capability of the longitudinal ribs of the tire to separate or expand laterally greatly increases the resiliency of the tire and consequently its tractive efficiency, less energy being absorbed by internal stresses than results from ordinary compression where the rubber simply expands in all directions transverse to the force of compression.

In Fig. 3 of the drawing it will be noted that the base of the tire is provided with beads 6 adapted to engage the inturned edges of the well known "Clencher" rim.

In order to permit the tire to be easily seated upon such a rim, I preferably provide a central base-groove 8 which permits the outer sides of the base of the tire to be forced toward each other so that the beads 6 may pass by the inturned edges 7.

With this construction radial pressure on the tire tends only to more firmly keep the beads seated. However, to more positively prevent displacement of the beads I may fill the groove 8 with a cement or filler which will keep the sides of the base separated. For this purpose I preferably employ a cement which may be introduced while in a fluid condition and will afterward harden, such as plaster-of-paris, or a cement which is fluid when heated. Such a cement is indicated by the numeral 9.

Having described this embodiment of invention, what I claim as my invention and desire to protect by Letters Patent is:—

1. An elastic vehicle tire comprising a substantially solid body portion having a central circumferential groove on the tread thereof, and continuous shallow grooves extending across the sides of the tire and intersecting said central groove, there being substantial plane spaces between successive side grooves.

2. An elastic vehicle tire comprising a substantially solid body portion having a central circumferential groove on the tread thereof, and continuous, shallow, radially inclined grooves extending across the sides of the tire and the tread and intersecting said central groove.

3. An elastic vehicle tire comprising a substantially solid body portion having two rounded tread portions separated by a central circumferential groove and continuous, shallow, radially inclined grooves extending across the sides of the tire and across said rounded tread portions on each side of the tire respectively.

4. An elastic vehicle tire comprising a substantially solid body portion having two rounded tread portions separated by a central circumferential groove and continuous, shallow, radially inclined grooves extending across the sides of the tire and across said rounded tread portions at alternate points thereon.

5. An elastic vehicle tire comprising a substantially solid body portion having two rounded tread portions separated by a central circumferential groove and continuous, shallow, radially inclined grooves extending across the sides of the tire and across said rounded tread portions, and having substantial plane surfaces between said grooves.

Signed this 11th day of November, 1911.

THOMAS MIDGLEY.

Witnesses:
VIVIAN L. STONE,
FRANK E. SCHULTZ.